US012615497B2

(12) United States Patent
Hutchison et al.

(10) Patent No.: US 12,615,497 B2
(45) Date of Patent: Apr. 28, 2026

(54) WIRELESS MEDIA SYSTEMS

(71) Applicant: Sonos Scotland Limited, Glasgow (GB)

(72) Inventors: Kyle Hutchison, Glasgow (GB); Jordy James Drennan Hamilton, Glasgow (GB)

(73) Assignee: Sonos, Inc., Goleta, CA (US)

( * ) Notice: Subject to any disclaimer, the term of this patent is extended or adjusted under 35 U.S.C. 154(b) by 646 days.

(21) Appl. No.: 17/912,356

(22) PCT Filed: Mar. 17, 2021

(86) PCT No.: PCT/GB2021/050662
§ 371 (c)(1),
(2) Date: Sep. 16, 2022

(87) PCT Pub. No.: WO2021/186170
PCT Pub. Date: Sep. 23, 2021

(65) Prior Publication Data
US 2023/0188962 A1    Jun. 15, 2023

(30) Foreign Application Priority Data
Mar. 18, 2020    (GB) ...................................... 2003935

(51) Int. Cl.
*H04W 4/42*          (2018.01)
*H04W 4/48*          (2018.01)
*H04W 4/80*          (2018.01)
(52) U.S. Cl.
CPC ............... *H04W 4/42* (2018.02); *H04W 4/48* (2018.02); *H04W 4/80* (2018.02)

(58) Field of Classification Search
CPC ............ H04W 4/42; H04W 4/48; H04W 4/80
(Continued)

(56) References Cited

U.S. PATENT DOCUMENTS 5,440,644 A    8/1995    Farinelli et al.
5,761,320 A    6/1998    Farinelli et al.
(Continued)

FOREIGN PATENT DOCUMENTS

EP         1389853 A1      2/2004
EP         3086301 A1 * 10/2016    ............ B60W 10/00
(Continued)

OTHER PUBLICATIONS

International Searching Authority, PCT International Search Report and Written Opinion, PCT International Application No. PCT/US2021/050662 dated Sep. 17, 2021, 18 pages.
(Continued)

*Primary Examiner* — April G Gonzales

(57) ABSTRACT

A method for pairing a first wireless media device with a wireless audio device. The method comprising the steps of receiving a first advertising packet from the first wireless media device, establishing a first connection between a user device and the first wireless media device, transmitting a first identifier associated with the wireless audio device from the user device to the first wireless media device, establishing a second connection between the wireless audio device and the first wireless media device based on the identifier and terminating the first connection between the user device and the first wireless media device.

20 Claims, 8 Drawing Sheets

(58) Field of Classification Search
USPC ........................................................ 455/41.2
See application file for complete search history.

(56) References Cited

U.S. PATENT DOCUMENTS

| | | | |
|---|---|---|---|
| 5,923,902 | A | 7/1999 | Inagaki |
| 6,032,202 | A | 2/2000 | Lea et al. |
| 6,256,554 | B1 | 7/2001 | DiLorenzo |
| 6,404,811 | B1 | 6/2002 | Cvetko et al. |
| 6,469,633 | B1 | 10/2002 | Wachter |
| 6,522,886 | B1 | 2/2003 | Youngs et al. |
| 6,611,537 | B1 | 8/2003 | Edens et al. |
| 6,631,410 | B1 | 10/2003 | Kowalski et al. |
| 6,757,517 | B2 | 6/2004 | Chang |
| 6,778,869 | B2 | 8/2004 | Champion |
| 6,798,889 | B1 | 9/2004 | Dicker et al. |
| 7,130,608 | B2 | 10/2006 | Hollstrom et al. |
| 7,130,616 | B2 | 10/2006 | Janik |
| 7,143,939 | B2 | 12/2006 | Henzerling |
| 7,236,773 | B2 | 6/2007 | Thomas |
| 7,295,548 | B2 | 11/2007 | Blank et al. |
| 7,391,791 | B2 | 6/2008 | Balassanian et al. |
| 7,483,538 | B2 | 1/2009 | McCarty et al. |
| 7,571,014 | B1 | 8/2009 | Lambourne et al. |
| 7,630,501 | B2 | 12/2009 | Blank et al. |
| 7,643,894 | B2 | 1/2010 | Braithwaite et al. |
| 7,657,910 | B1 | 2/2010 | McAulay et al. |
| 7,853,341 | B2 | 12/2010 | McCarty et al. |
| 7,987,294 | B2 | 7/2011 | Bryce et al. |
| 8,014,423 | B2 | 9/2011 | Thaler et al. |
| 8,045,952 | B2 | 10/2011 | Qureshey et al. |
| 8,103,009 | B2 | 1/2012 | McCarty et al. |
| 8,234,395 | B2 | 7/2012 | Millington |
| 8,483,853 | B1 | 7/2013 | Lambourne |
| 8,942,252 | B2 | 1/2015 | Balassanian et al. |
| 9,009,805 | B1* | 4/2015 | Kirkby ............... H04N 21/4622 709/224 |
| 9,288,597 | B2 | 3/2016 | Carlsson et al. |
| 9,820,323 | B1* | 11/2017 | Young ..................... H04W 4/80 |
| 9,948,762 | B2* | 4/2018 | Juzswik ............... H04B 1/3822 |
| 2001/0042107 | A1* | 11/2001 | Palm ....................... G06F 16/48 709/219 |
| 2002/0022453 | A1* | 2/2002 | Balog ................... H04W 40/02 455/41.2 |
| 2002/0026442 | A1* | 2/2002 | Lipscomb .......... H04N 21/4788 |
| 2002/0124097 | A1* | 9/2002 | Isely ..................... H04L 65/611 709/246 |
| 2003/0157951 | A1* | 8/2003 | Hasty, Jr. ............. H04W 88/16 455/519 |
| 2004/0024478 | A1* | 2/2004 | Hans ..................... G11B 27/034 381/119 |
| 2007/0142944 | A1* | 6/2007 | Goldberg ............. G10H 1/0025 700/94 |
| 2007/0206660 | A1* | 9/2007 | Lifchuk ................. H04B 1/715 375/132 |
| 2011/0287795 | A1* | 11/2011 | Cahill ................... H04L 5/0005 455/509 |
| 2012/0310477 | A1* | 12/2012 | Wippler ................. B60K 35/29 701/36 |
| 2013/0216071 | A1* | 8/2013 | Maher ..................... H04S 7/301 381/303 |
| 2013/0331970 | A1* | 12/2013 | Beckhardt ............... H04L 65/80 700/94 |
| 2014/0003625 | A1* | 1/2014 | Sheen ..................... H04R 3/04 381/103 |
| 2014/0037107 | A1* | 2/2014 | Marino, Jr. .......... H03G 3/3005 381/107 |
| 2015/0350820 | A1* | 12/2015 | Son ....................... H04W 12/03 455/41.2 |
| 2016/0020861 | A1* | 1/2016 | Jin ....................... H04W 4/023 455/456.1 |
| 2016/0021473 | A1* | 1/2016 | Riggi ..................... H04W 4/80 381/59 |
| 2016/0139241 | A1* | 5/2016 | Holz ...................... H04B 17/27 367/128 |
| 2016/0309276 | A1* | 10/2016 | Ridihalgh ............... G06F 3/165 |
| 2017/0018001 | A1* | 1/2017 | Tunnell .............. G06Q 30/0269 |
| 2017/0182957 | A1* | 6/2017 | Watson ................. H04L 67/125 |
| 2018/0018704 | A1* | 1/2018 | Tunnell .............. G06Q 30/0269 |
| 2019/0191304 | A1* | 6/2019 | Hatch ................... H04W 12/55 |
| 2019/0208396 | A1* | 7/2019 | Thoen ................... H04L 5/0035 |
| 2019/0356741 | A1* | 11/2019 | Watson ................. H04L 67/125 |
| 2020/0021328 | A1* | 1/2020 | Haartsen .............. H04B 1/7143 |
| 2022/0141608 | A1* | 5/2022 | Terwal ................... H04R 1/403 381/302 |
| 2023/0088236 | A1* | 3/2023 | Medin ................. H04N 21/431 725/76 |

FOREIGN PATENT DOCUMENTS

| | | |
|---|---|---|
| WO | 200153994 | 7/2001 |
| WO | 2003093950 A2 | 11/2003 |
| WO | 2016144219 A1 | 9/2016 |

OTHER PUBLICATIONS

Audio Tron Quick Start Guide, Version 1.0, Mar. 2001, 24 pages.
Audio Tron Reference Manual, Version 3.0, May 2002, 70 pages.
Audio Tron Setup Guide, Version 3.0, May 2002, 38 pages.
Bluetooth. "Specification of the Bluetooth System: The ad hoc SCATTERNET for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, Dec. 1, 1999, 1076 pages.
Dell, Inc. "Dell Digital Audio Receiver: Reference Guide," Jun. 2000, 70 pages.
Dell, Inc. "Start Here," Jun. 2000, 2 pages.
"Denon 2003-2004 Product Catalog," Denon, 2003-2004, 44 pages.
International Bureau, International Search Report and Written Opinion mailed on Sep. 17, 2021, issued in connection with International Application No. PCT/GB2021/050662, filed on Mar. 17, 2021, 17 pages.
Jo et al., "Synchronized One-to-many Media Streaming with Adaptive Playout Control," Proceedings of SPIE, 2002, pp. 71-82, vol. 4861.
Jones, Stephen, "Dell Digital Audio Receiver: Digital upgrade for your analog stereo," Analog Stereo, Jun. 24, 2000 http://www. reviewsonline.com/articles/961906864.htm retrieved Jun. 18, 2014, 2 pages.
Louderback, Jim, "Affordable Audio Receiver Furnishes Homes With MP3," TechTV Vault. Jun. 28, 2000 retrieved Jul. 10, 2014, 2 pages.
Palm, Inc., "Handbook for the Palm VII Handheld," May 2000, 311 pages.
Presentations at WinHEC 2000, May 2000, 138 pages.
*Sonos, Inc.* v. *DM Holdings* (No. 14-1330-RGA), DI 219, Claim Construction Opinion (Jan. 12, 2017) (24 pages).
United Kingdom Patent Office, United Kingdom Office Action mailed on Apr. 27, 2023, issued in connection with United Kingdom Application No. GB2003935.0, 6 pages.
United States Patent and Trademark Office, U.S. Appl. No. 60/490,768, filed Jul. 28, 2003, entitled "Method for synchronizing audio playback between multiple networked devices," 13 pages.
United States Patent and Trademark Office, U.S. Appl. No. 60/825,407, filed Sep. 12, 2006, entitled "Controlling and manipulating groupings in a multi-zone music or media system," 82 pages.
UPnP; "Universal Plug and Play Device Architecture," Jun. 8, 2000; version 1.0; Microsoft Corporation; pp. 1-54.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.

* cited by examiner

310

302

318

312

314

304

308

316

306

401a

401

402

403

WIRELESS MEDIA SYSTEMS

FIELD OF THE INVENTION

This invention relates to wireless media systems and particularly, but not exclusively, methods and apparatuses for reducing congestion or interference in wireless media systems.

BACKGROUND TO THE INVENTION

Use of personal wireless entertainment devices is becoming commonplace. In particular, use of short-range RF communications between mobile or portable devices, as well as fixed or installed devices, is increasing.

A particular issue is establishing connections between Bluetooth devices without screens or UI, e.g., wireless headsets. Establishing a connection between a UI-less device and another Bluetooth device relies entirely on the devices carrying out a pairing process substantially without user interaction. Typically, if no other Bluetooth-enabled devices are located in close proximity during the pairing process, this does not cause any problems.

However, in situations where a large number of Bluetooth-enabled devices are attempting to connect with respective other devices, such as is the case during boarding of an aircraft when passengers will tend to connect with the aircraft's in-flight entertainment system. During such periods, the risk of erroneous or missed connections increases.

This is exacerbated in circumstances wherein parts of an available RF spectrum is being used for other purposes (e.g., if the aircraft has a WiFi™ network). This limits the available RF spectrum, thereby increasing the risk of interference or congestion.

The inventors of the present invention have appreciated the shortcomings with such known systems.

SUMMARY OF THE INVENTION

In accordance with a first aspect of the invention, there is provided a method for pairing a first wireless media device with a wireless audio device, the method comprising:

receiving a first advertising packet from the first wireless media device;

establishing a first connection between a user device and the first wireless media device;

transmitting a first identifier associated with the wireless audio device from the user device to the first wireless media device;

establishing a second connection between the wireless audio device and the first wireless media device based on the identifier; and terminating the first connection between the user device and the first wireless media device.

The first identifier may be a communications address assigned to the wireless audio device. The first identifier may be a Bluetooth device address assigned to the wireless audio device.

The first advertising packet may comprise a first physical location identifier associated with the first wireless media device.

The step of establishing the first connection comprises:

comparing the first physical location identifier associated with the first wireless media device with a second physical location identifier associated with a user; and based on a match between the first physical location identifier and the second physical location identifier, enabling a first connection protocol between the user device and the first wireless media device.

The first physical location identifier may be a seat number associated with the first wireless media device.

The second physical location identifier may be a seat number associated with the user.

The step of establishing the first connection may further comprise a step of scanning for advertising packets.

The first connection may be a Bluetooth™ LE connection.

The step of establishing a second connection may comprise:

initiating, at the wireless audio device, a pairing protocol;

completing, at the first wireless media device, the pairing protocol based on the first identifier; and initialising a path connection between the first wireless media device and the wireless audio device.

The step of completing may comprise:

comparing the first identifier received by the first wireless media device from the user device with a second identifier received from the wireless audio device; and based on a match between the first identifier and the second identifier completing the pairing protocol between the first wireless media device and the wireless audio device.

The second connection may be a Bluetooth Classic connection.

The method as set out above may further comprise a step of determining the presence of a third connection between the user device and the wireless audio device.

In accordance with a second aspect of the present invention, there is provided a method for a first wireless media device, the method comprising:

periodically transmitting a first advertising packet;

receiving a first connection request from a user device;

establishing the first connection between the first wireless media device and the user device;

receiving a first identifier associated with a wireless audio device from the user device, the wireless audio device being connected with the user device;

establishing a second connection between the first wireless media device and the wireless audio device based on the first identifier; and terminating the first connection with the user device.

The first identifier may be a communications address assigned to the wireless audio device. The first identifier is a Bluetooth device address assigned to the wireless audio device.

The first advertising packet may comprise a first physical location identifier associated with the first wireless media device. The first physical location identifier may be a seat number associated with the first wireless media device.

The first connection may be a Bluetooth™ LE connection.

The step of establishing a second connection may comprise:

completing, at the first wireless media device, a pairing protocol initiated at the wireless audio device based on the first identifier; and initialising a path connection between the first wireless media device and the wireless audio device.

The second connection may be a Bluetooth™ Classic connection.

In accordance with a third aspect of the present invention, there is provided a method for a user device, the method comprising:

receiving an advertising packet from a first wireless media device;

3 transmitting a first connection request to the first wireless media device;

establishing a first connection between the user device and the first wireless media device;

transmitting a first identifier associated with a wireless audio device to the first wireless media device, the wireless audio device being connected with the user device; and terminating the first connection with the first wireless media device.

The first identifier may be a communications address assigned to the wireless audio device. The first identifier may be a Bluetooth device address assigned to the wireless audio device.

The first advertising packet may comprise a first physical location identifier associated with the first wireless media device. The first physical location identifier may be a seat number associated with the first wireless media device.

The first connection may be a Bluetooth™ LE connection.

In accordance with a fourth aspect of the present invention, there is provided a method of managing a wireless media system, the system comprising a plurality of wireless media devices, the method comprising:

periodically transmitting advertising packets from at least some of the plurality of wireless media devices;

establishing at least one first connection between at least one of the plurality of wireless media devices and at least one corresponding user device;

receiving at least one identifier associated with at least one wireless audio device, each of the at least one wireless audio devices being connected with a corresponding one of the at least one user device;

establishing at least one second connection between the at least one of the plurality of wireless media devices and the at least one wireless audio device; and terminating the at least one first connection.

The at least one identifier may be a communications address assigned to the at least one wireless audio device. The at least one identifier may be a Bluetooth device address assigned to the at least one wireless audio device.

Each of the advertising packets may comprise a first physical location identifier associated with a corresponding one of the first wireless media devices.

The step of establishing the first connection may comprise:

comparing the first physical location identifier associated with the at least one wireless media device with a second physical location identifier associated with a user; and based on a match between the first physical location identifier and the second physical location identifier, enabling a first connection protocol between the user device and the at least one wireless media device.

The first physical location identifier may be a seat number associated with the at least one wireless media device.

The second physical location identifier may be a seat number associated with the user.

The step of establishing the first connection may further comprise a step of scanning for advertising packets.

The first connection may be a Bluetooth™ LE connection.

The step of establishing a second connection may comprise:

initiating, at the wireless audio device, a pairing protocol;

completing, at the at least one wireless media device, the pairing protocol based on the first identifier; and initialising a path connection between the at least one wireless media device and the wireless audio device.

The step of completing may comprise:

comparing the first identifier received by the first wireless media device from the user device with a second identifier received from the wireless audio device; and based on a match between the first identifier and the second identifier completing the pairing protocol between the at least one wireless media device and the wireless audio device.

The second connection may be a Bluetooth™ Classic connection.

The method as set out above may further comprise a step of determining the presence of a third connection between the at least one user device and the wireless audio device.

In accordance with a fifth aspect of the present invention, there is provide a method for managing congestion in a wireless media system, the wireless media system comprising a plurality of wireless media devices, comprising:

managing transmission power of at least a portion of the plurality of wireless media devices; and managing communication channel allocations for at least a portion of the plurality of wireless media devices.

The step of managing communication channel allocations may comprise:

selecting at least a first plurality of communication channels amongst a set of available communication channels;

selecting at least a second plurality of communication channels amongst the set of communication available channels;

assigning the first plurality of communication channels to a first subset of the plurality of wireless media devices; and assigning the second plurality of communication channels to a second subset of the plurality of wireless media devices.

The first plurality may comprise at least 5 communication channels; optionally at least 10 communication channels: optionally at least 15 communication channels; or optionally at least 20 communication channels. The first plurality may comprise 20 communication channels.

The second plurality may comprise at least 5 communication channels; optionally at least 10 communication channels: optionally at least 15 communication channels; or optionally at least 20 communication channels. The second plurality may comprise 20 communication channels.

Each communication channel comprised in the first plurality may be different to each communication comprised in the second plurality.

The first subset may comprise half of the plurality of wireless media devices and the second subset may comprise the other half of the plurality of wireless media devices.

The method as set out above may further comprise a step of assigning each one of the wireless media devices in the plurality of wireless media devices to one of the at least first subset or the at least second subset.

In accordance with a sixth aspect of the present invention, there is provided a wireless media device comprising means for carrying out the method as set out above.

The wireless media device may comprise:

a display unit;

a processor, the processor being operable to carry out relevant steps of a method as set out above;

a memory unit; and a communications module, wherein the communications module comprises a transceiver element, the transceiver element being operable to carry out relevant steps of a methods as set out above.

In accordance with a seventh aspect of the present invention, there is provided a computer program product for a wireless media device comprising one or more sequences of machine-readable instructions for implementing the method as set out above.

In accordance with an eighth aspect of the present invention, there is provided a user device comprising means for carrying out the method as set out above.

In accordance with a ninth aspect of the present invention, there is provided a computer program product for a user device comprising one or more sequences of machine-readable instructions for implementing a method as set out above.

In accordance with a tenth aspect of the present invention, there is provided a transceiver element for a communications module, the transceiver element comprising:

an antenna; and a shielding element, wherein the transceiver element is operable to carry out relevant steps of a method as set out above.

The shielding element may be operable to shield or attenuate any wireless signals transmitted to or from the antenna in a first set of azimuth angles and a first set of elevation angles.

In accordance with an eleventh aspect of the present invention, there is provided a wireless media system, the wireless media system comprising means for carrying out a method as set out above.

The wireless media system may comprise at least one wireless media device. The wireless media system may comprise at least one wireless media device as set out above.

The at least one wireless media device may comprise a transceiver element as set out above.

In accordance with a twelfth aspect of the present invention, there is provided a computer program product for a wireless media system comprising one or more sequences of machine-readable instructions for implementing a method as set out above.

BRIEF DESCRIPTION OF THE DRAWINGS

An embodiment of the invention will now be described, by way of example, with reference to the drawings, in which.

DESCRIPTION OF THE PREFERRED EMBODIMENTS

Before describing the exemplary embodiments of the invention, it may be illustrative to describe an exemplary environment in which the exemplary embodiments may be implemented. It will, of course, be appreciated that the following environment is exemplary only, and not intended to be limiting. Other environments, comprising alternative or additional components, may easily be envisaged.

Figure 1:
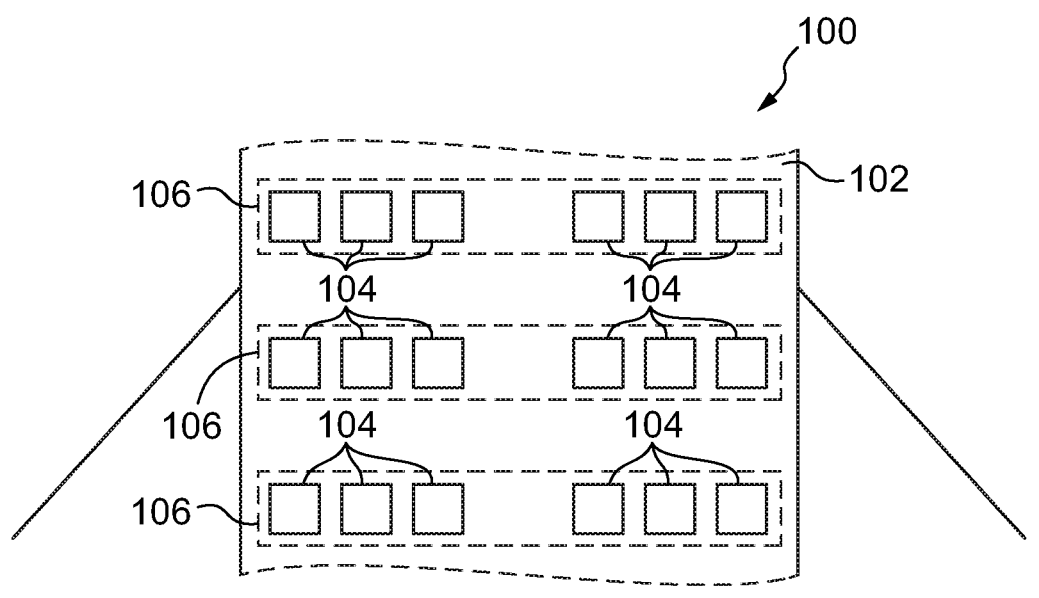
FIG. 1 shows an exemplary environment in which the embodiments of the present disclosure may be implemented.

Such an exemplary environment in which the embodiments of the present invention may be implemented will now be discussed with reference to FIG. 1.

A passenger aircraft 100 has a passenger cabin 102, wherein is located a number of seats 104 arranged in a number of discrete rows 106. As is common, the rows are arranged so as to be perpendicular with the central axis of the aircraft fuselage. The passenger cabin, in the present example, has a single central aisle 108. It will be appreciated that larger aircraft may have more than one aisle.

Typically, each row is numbered consecutively, beginning with the row at the front of the fuselage. In certain situations, non-consecutive numbers may be used (e.g., to avoid certain row numbers). Seats are typically designated by a letter, starting with the left-most (in the direction of flight) seat.

It should be noted that, in some cases (notably in aircraft with 'first' or 'business' class seats), seats do not strictly conform to a row structure. However, it will be appreciated that the principles as disclosed in the following may be applied equally well to such seat arrangements.

Figure 2:
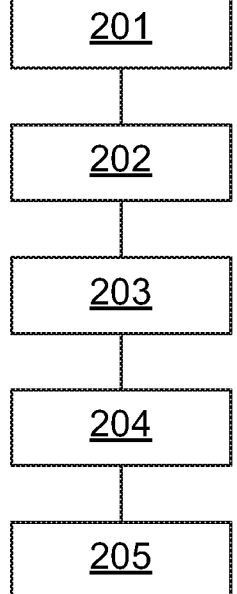
FIG. 2 illustrates an exemplary method of pairing a first wireless media device with a wireless audio device in accordance with an aspect of the present disclosure.
Figure 3:
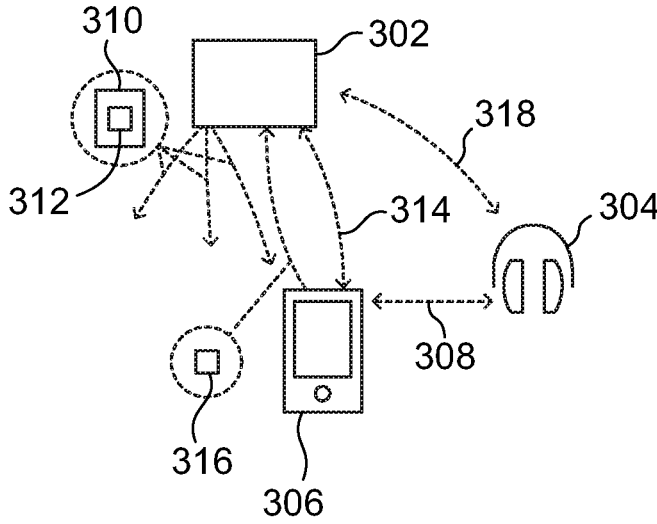
FIG. 3 shows schematically the method of FIG. 2.

An exemplary embodiment of the invention will now be described with reference to FIG. 2 and FIG. 3. In this example, there is provided a method for pairing a first wireless media device 302 with a wireless audio device 304.

In the present example, the wireless audio device is connected or paired with a user device 306 by way of a suitable connection 308. In some examples, the wireless audio device is a wireless set of head- or earphones. In specific examples, the wireless audio device is a set of Bluetooth™ headphones. Typically, the wireless audio device will be connected to the user device, so that the user can utilise the user device to play media.

In a first step 201, a first advertising packet 310 is received from the first wireless media device. The first advertising packet may be received in any suitable fashion. In some examples, it is received by way of a wireless communication protocol, including (but not limited to): Bluetooth™ Classic; Bluetooth™ LE; Wi-Fi™; or ZigBee™.

The first advertising packet may comprise any suitable information. In some examples, the first advertising packet comprises identifiers relating to one or more aspects or properties of, or relating to, the first wireless media device.

In some examples, the first advertising packet comprises a first physical location identifier 312 associated with the first wireless media device. This enables a device receiving the first advertising packet to determine the location or position of the first wireless media device.

The first physical location identifier may comprise any suitable information or indicator of the location of the first wireless media device. In some examples, the first physical location identifier comprises absolute position information, such as information that indicates the location of the first wireless media device within a suitable reference frame (e.g., an aircraft interior). In such examples, a physical location identifier can be used to directly locate the corresponding first wireless media device.

In other examples, the first physical location identifier comprises relative position information or data. Such information allows proximity or a position relative to the wireless media device to be determined. In such examples, it is not necessary to know the absolute position of the wireless media device. In some examples, the position or location of the first wireless media device may be determined with reference to one or more features or objects within the relevant space. In an example, the first physical location identifier is a seat number. In this example, the seat number is a string of alphanumeric characters formatted in a suitable manner. In some examples, the physical location identifier is a seat number and comprises additional location information, including (but not limited to): cabin section; seating class or type; or ticket type. The additional location information may, in some examples, be used to enable additional operations, actions or processes to be carried out in dependence on the type of information or the information contents.

The first physical location identifier may be formatted or encoded in any suitable manner. In some examples, the first physical location identifier is encoded in accordance with one or more communication protocols, including (but not limited to): Bluetooth™ Classic; Bluetooth™ LE; Wi-Fi™; or ZigBee™. In some examples, the first physical location identifier is encoded in accordance with a wireless communication protocol. In an example, the first physical location identifier is encoded and formatted in accordance with the Bluetooth™ communication protocol.

In some examples, the first physical location identifier is encrypted in accordance with an appropriate encryption scheme or algorithm. It will be appreciated that numerous encryption schemes or algorithms may be envisaged within the scope of the present disclosure.

In a second step 202, a first connection 314 is initiated between the user device 306 and the first wireless media device 302. The first connection may be initiated in any suitable manner. In some examples, the first connection is initiated in accordance with a wireless communication protocol, including (but not limited to): Bluetooth™; Wi-Fi™; or ZigBee™. Typically, connections between devices consist of a number of specified steps that are intended to ensure that a given connection is stable and secure. Such connection steps may be specified by the particular protocol standard.

In some examples, however, one or more additional steps are performed before, during or after the specified connection steps. Such additional steps may, for example, comprise additional security checks, device-specific operations, additional encoding or decoding, additional encryption or decryption, or any other such operations. In some examples, one or more sequences of additional steps may be carried out.

In a specific example, the step of establishing the first connection comprises substeps of: comparing the first physical location identifier associated with the first wireless media device with a second physical location identifier associated with a user; and based on a match between the first physical location identifier and the second physical location identifier, enabling a first connection protocol between the user device and the first wireless media device.

The second physical location identifier has a suitable encoding, format and/or encryption. The second physical location identifier comprises any suitable information or data content. It will be appreciated that, in order to carry out the comparison sub-step, the second physical location identifier must be comparable with the first physical location identifier. In some examples, the second physical location identifier is formatted and/or encoded, and contains substantially identical information or data content, as the first physical location identifier. In an example, the second physical location identifier is a seat number associated with the user.

The comparison sub-step is carried out in a suitable fashion. It will be appreciated that the details of this step is dependent on the format and/or encoding of the first physical location identifier and that of the second physical location identifier. In an example, wherein first physical location identifier and the second physical location identifier comprise alphanumeric strings, the comparison sub-step comprises comparing the alphanumeric string of the first physical location identifier directly with the alphanumeric string of the second physical location identifier.

For example, if both of the physical location identifiers comprise a seat number, the result of the comparison is that there is either a match or a mismatch between the seat number associated with the wireless media device and the seat number associated with the user. In case of a match, it may be concluded that the user is attempting to connect to the media device located at their assigned seat.

Based on a match between the first physical location identifier and the second physical location identifier, a second sub-step of enabling a first connection protocol between the user device and the first wireless media device is performed. As described above, the first connection may utilise a wireless communication protocol, including (but not limited to): Bluetooth™ Classic; Bluetooth™ LE; Wi-Fi™; or ZigBee™. Such communication protocols typically comprise specific sub-protocols or standards for establishing connections between devices.

The establishing step may comprise further optional or addition sub-steps. In an example, the establishing step comprises a further sub-step of scanning for advertising packets. The scanning may be performed in any suitable fashion and using a suitable communication protocol.

In a third step 203, a first identifier 316 associated with the wireless audio device 304 is transmitted from the user device 306 to the first wireless media device 302. The first identifier may contain any suitable or relevant information associated with the wireless audio device in order to suitably identify the wireless audio device. In some examples, the first identifier comprises a unique identifier (e.g., a unique identification number). In some examples, the first identifier is a communications address assigned to the wireless audio device. In an example, the first identifier is a Bluetooth™ device address assigned to the wireless audio device.

Transmitting the first identifier from the user device to the first wireless media device allows the first wireless media device to connect directly to the wireless audio device.

In a fourth step 204, a second connection 318 is initiated between the wireless audio device 304 and the first wireless media device 302 based on the first identifier 316. The second connection may be any suitable connection using a suitable protocol. Examples of suitable protocols include (without limitation): Bluetooth™ Classic; Bluetooth™ LE; Wi-Fi™; or ZigBee™.

The connection may be initiated in any suitable fashion and using any suitable methodology. A specific example of an establishing step will be described in more detail below.

In a fifth step 205, the first connection 314 between the user device 306 and the first wireless media device 302 is terminated. The termination may be effected in any suitable fashion. In some examples, the termination step is carried out in accordance with a connection termination methodology set out by the communication protocol.

It will be appreciated that the above-described method may, in some examples, comprise additional or optional steps.

In one example, the method comprises a step of determining the presence of a third connection between the user device and the wireless audio device. This may be accomplished in any suitable fashion, and may include a determination of the type of connection between the user device and the wireless audio device.

Figure 4:
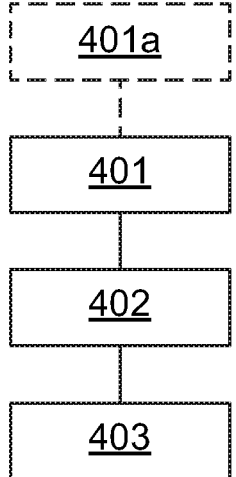
FIG. 4 illustrates an exemplary establishing step for a first connection in accordance with an aspect of the present disclosure.

An exemplary step for establishing a second connection will now be described in more detail with reference to FIG. 4. It will be appreciated that this step is exemplary only, and that other implementations of the establishing step could be envisaged within the scope of the present disclosure.

In a first establishing step 401, a pairing protocol is initiated at the wireless audio device. The pairing protocol may be initiated in any suitable or applicable manner. In some examples, it is necessary for the user to manually enable the pairing protocol at the wireless audio device (e.g., by interacting with the wireless audio device in a suitable manner, such as depressing a pairing button).

The establishing step may be a required step as part of the pairing protocol. For example, it may be necessary to actively enable a pairing protocol at both devices for security reasons (e.g., to verify that it is a user that seeks to connect the wireless audio device with the wireless media device rather than an unauthorised third party). This may be particularly relevant in situations where one of the devices does not have a graphical user interface, for example due to size restrictions. As wireless headsets are generally too small to have any graphical user interfaces, it is generally necessary to actively enable a pairing protocol (e.g., a Bluetooth™ pairing protocol) by physically activating or interacting with the headset.

In a specific example, the first establishing step comprises a first establishing sub-step 401*a*, in which the first wireless media device transmits a prompt to the user device. In some examples, the prompt comprises a notification to enable a pairing protocol. In some examples, the prompt is displayed in a relevant manner to a user of the user device as part of the establishing sub-step.

In a second establishing step 402, a pairing protocol is completed at the first wireless media device, the pairing protocol being based on the first identifier. The first identifier may be utilised in any suitable fashion as part of the pairing protocol. It will be appreciated that a number of specific implementations of the completion step may be envisaged by the skilled person within the present disclosure. An exemplary completion step will be described in more detail below.

In the present example, wherein the pairing protocol is a Bluetooth™ protocol, the first identifier is used by the first wireless media device to identify the wireless audio device belonging to the correct user. This reduces the risk of connecting to a wireless audio device not belonging to the correct user, which is a particular risk if several users are attempting to connect their personal wireless audio devices with respective wireless media devices. In the example described above, wherein the wireless media devices are installed in an aircraft cabin, it is likely that a significant proportion of passengers will simultaneously attempt to connect their personal wireless headsets to the flight entertainment systems at their seats. This increases the risk of accidental misconnections.

In a third establishing step 403, a path connection is initialised between the first wireless media device and the wireless audio device. The path connection may be initialised in any suitable manner. In some examples, the path connection is automatically initialised on completion of the pairing protocol.

It will be appreciated that, in addition to the above steps described in detail, the establishing step may comprise additional sub-steps, such as sub-steps dictated or mandated by one or more of: the communication protocol used for the second connection; the pairing protocol used to establish the second connection; hardware requirements for either of the wireless media device or wireless audio device; or security requirements for either of the wireless media device, wireless audio device or any externally mandated requirements. In some examples, the additional sub-steps comprise (without limitation): encoding; encryption; formatting; or other transformation of data, packets or other informational content.

Figure 5:
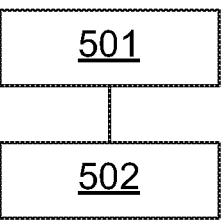
FIG. 5 illustrates an exemplary completion step in accordance with an aspect of the present disclosure.

An exemplary completion step, which may be implemented as part of the above-described establishing step, will now be described with reference to FIG. 5.

In a first completing step 501, the first identifier received by the first wireless media device from the user device is compared with a second identifier received from the wireless audio device. The comparison may be implemented in any suitable manner. In some examples, wherein the first identifier and the second identifier are a string of alphanumeric characters or other uniquely representative values, the comparison is implemented as a simple value or character comparison. If all values or characters of the first identifier are identical to the respective values or characters of the second identifier, it will be concluded that the first and second identifiers are identical.

It will be appreciated, of course, that the above is merely an exemplary comparison methodology, and that variations thereof or alternative implementations may be envisaged within the scope of the present disclosure.

In a second completing step 502, based on a match between the first identifier and the second identifier, the pairing protocol between the first wireless media device and the wireless audio device is completed. As described above, the pairing protocol may be completed in any suitable fashion. In some examples, as would be expected, the pairing protocol is completed in a manner consistent with or mandated by the connection protocol used for the second connection.

Figure 6:
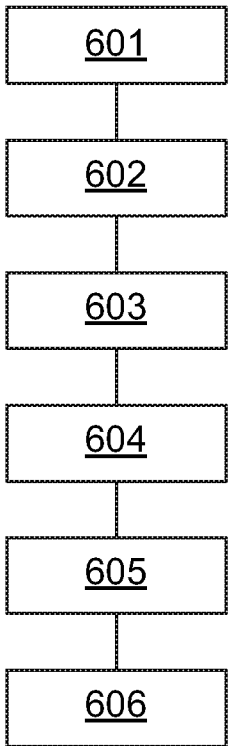
FIG. 6 shows an exemplary method for a wireless media device in accordance with an aspect of the present disclosure.

An exemplary embodiment of a method for a wireless media device will now be described with reference to FIG. 6. For purposes of conciseness and clarity, only features and elements that differ substantially from corresponding features and elements described above will be discussed in detail in the following.

In a first step 601, the wireless media device periodically transmits a first advertising packet. The first advertising packet may be transmitted in any suitable fashion. In some examples, it is transmitted by way of a wireless communication protocol, including (but not limited to): Bluetooth™ Classic; Bluetooth™ LE; Wi-Fi™; or ZigBee™.

As described above, the first advertising packet may in this example comprise any suitable information. In some examples, the first advertising packet comprises identifiers relating to one or more aspects or properties of, or relating to, the first wireless media device. In some examples, the first advertising packet comprises a first physical location identifier associated with the first wireless media device. This enables a device receiving the first advertising packet to determine the location or position of the first wireless media device.

In a second step 602, a first connection request is received from a user device. As described above, the first connection request may be received in any suitable manner. In some examples, the first connection request is received by way of a wireless communication protocol, including (but not limited to): Bluetooth™ Classic; Bluetooth™ LE; Wi-Fi™; or ZigBee™. In a specific example, the first connection request is received by way of the Bluetooth™ LE communication protocol.

In a third step 603, the first connection is established between the first wireless media device and the user device. The first connection may, as described above, be established in any convenient or suitable way.

In some examples, one or more additional steps are performed before, during or after the specified connection steps. Such additional steps may, for example, comprise additional security checks, device-specific operations, additional encoding or decoding, additional encryption or decryption, or any other such operations. In some examples, one or more sequences of additional steps may be carried out.

In a fourth step 604, a first identifier associated with a wireless audio device is received from the user device, the wireless audio device being connected with the user device. As previously described, the first identifier may contain any suitable or relevant information associated with the wireless audio device in order to suitably identify the wireless audio device. In some examples, the first identifier comprises a unique identifier (e.g., a unique identification number). In some examples, the first identifier is a communications address assigned to the wireless audio device. In an example, the first identifier is a Bluetooth™ device address assigned to the wireless audio device.

In a fifth step 605, a second connection is established between the first wireless media device and the wireless audio device based on the first identifier; and terminating the first connection with the user device. The second connection may be any suitable connection using a suitable protocol. Examples of suitable protocols include (without limitation): Bluetooth™ Classic; Bluetooth™ LE; Wi-Fi™; or ZigBee™.

The connection may be established in any suitable fashion and using any suitable methodology. A specific example of an establishing step will be described in more detail below.

In a sixth step 606, the first connection between the user device and the first wireless media device is terminated. The termination may be effected in any suitable fashion. In some examples, the termination step is carried out in accordance with a connection termination methodology set out by the communication protocol.

Figure 7:
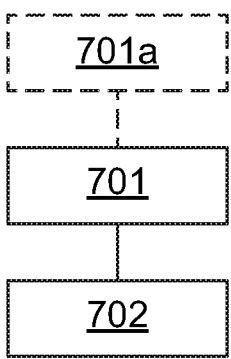
FIG. 7 illustrates an exemplary establishing step for a second connection in accordance with an aspect of the present disclosure.

An exemplary step for establishing a second connection will now be described in more detail with reference to FIG. 7. It will be appreciated that this step is exemplary only, and that other implementations of the establishing step could be envisaged within the scope of the present disclosure. Furthermore, for purposes of conciseness and clarity, only features and elements that differ substantially from corresponding features and elements described above will be discussed in detail in the following.

In some examples, the establishing step comprises a first establishing sub-step 701*a*, in which the first wireless media device transmits a prompt to the user device. In some examples, the prompt comprises a notification to enable a pairing protocol at the wireless audio device. In some examples, the prompt is displayed in a relevant manner to a user of the user device as part of the establishing sub-step.

In a first establishing step 701, a pairing protocol is completed at the first wireless media device, the pairing protocol being based on the first identifier. The first identifier may be utilised in any suitable fashion as part of the pairing protocol. It will be appreciated that a number of specific implementations of the completion step may be envisaged by the skilled person within the present disclosure.

In the present example, wherein the pairing protocol is a Bluetooth™ protocol, the first identifier is used by the first wireless media device to identify the wireless audio device belonging to the correct user. This reduces the risk of connecting to a wireless audio device not belonging to the correct user, which, as explained, is a particular risk if several users are attempting to connect their personal wireless audio devices with respective wireless media devices.

In a second establishing step 702, a path connection is initialised between the first wireless media device and the wireless audio device. The path connection may be initialised in any suitable manner. In some examples, the path connection is automatically initialised on completion of the pairing protocol.

It will be appreciated that, in addition to the above steps described in detail, the establishing step may comprise additional sub-steps, such as sub-steps dictated or mandated by one or more of: the communication protocol used for the second connection; the pairing protocol used to establish the second connection; hardware requirements for the wireless media device; or security requirements for the wireless media device or any externally mandated requirements. In some examples, the additional sub-steps comprise (without limitation): encoding; encryption; formatting; or other transformation of data, packets or other informational content. In specific examples, the establishing sub-steps are variously carried out on or between either or both of the wireless media device and the wireless audio device.

Figure 8:
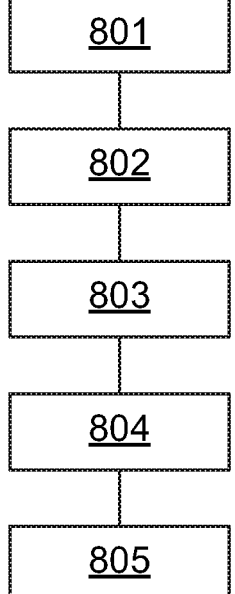
FIG. 8 shows an exemplary method for a user device in accordance with an aspect of the present disclosure.

An exemplary embodiment of a method for a user device, to which is connected a wireless audio device, will now be described with reference to FIG. 8. For purposes of conciseness and clarity, only features and elements that differ substantially from corresponding features and elements described above will be discussed in detail in the following.

In a first step 801, an advertising packet is received from a first wireless media device. The first advertising packet may be received in any suitable fashion. In some examples, it is received by way of a wireless communication protocol, including (but not limited to): Bluetooth™ Classic; Bluetooth™ LE; Wi-Fi™; or ZigBee™.

As described above, the first advertising packet may in this example comprise any suitable information. In some examples, the first advertising packet comprises identifiers relating to one or more aspects or properties of, or relating to, the first wireless media device. In some examples, the first advertising packet comprises a first physical location identifier associated with the first wireless media device. The first physical location identifier may comprise any suitable information or indicator of the location of the first wireless media device. In a specific example, the first physical location identifier is a seat number.

In a second step 802, a first connection request is transmitted to the first wireless media device. The first connection request may be transmitted in any suitable fashion using a suitable wireless communication protocol. In some examples, the same communication protocol used to receive the advertising packet is used to transmit the first connection request. In some examples, a different communication protocol than the one used to receive the advertising packet is used to transmit the first connection request. In some examples, it the connection request is transmitted is by way of a wireless communication protocol, including (but not limited to): Bluetooth™ Classic; Bluetooth™ LE; Wi-Fi™; or ZigBee™.

In a third step 803, a first connection is established between the user device and the first wireless media device. The first connection may, as described above, be established in any convenient or suitable way.

In some examples, one or more additional steps are performed before, during or after the specified connection steps. Such additional steps may, for example, comprise additional security checks, device-specific operations, additional encoding or decoding, additional encryption or decryption, or any other such operations. In some examples, one or more sequences of additional steps may be carried out.

In a fourth step 804, a first identifier associated with a wireless audio device is transmitted to the first wireless media device, the wireless audio device being connected with the user device.

As previously described, the first identifier may contain any suitable or relevant information associated with the wireless audio device in order to suitably identify the wireless audio device. In some examples, the first identifier comprises a unique identifier (e.g., a unique identification number). In some examples, the first identifier is a communications address assigned to the wireless audio device. In an example, the first identifier is a Bluetooth™ device address assigned to the wireless audio device.

The first identifier may subsequently be utilised to set up a second connection between the wireless media device and the wireless audio device, as substantially described in the above-mentioned examples.

In a fifth step 805, the first connection with the first wireless media device is terminated. The termination may be effected in any suitable fashion. In some examples, the termination step is carried out in accordance with a connection termination methodology set out by the communication protocol.

Figure 9:
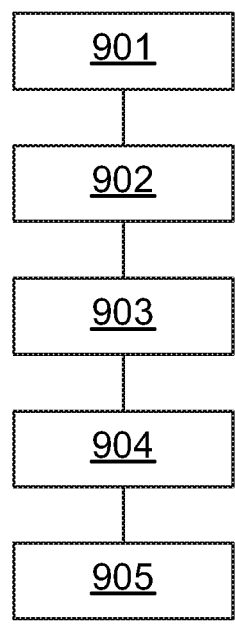
FIG. 9 illustrates an exemplary method of managing a wireless media system in accordance with an aspect of the present disclosure.
Figure 10:
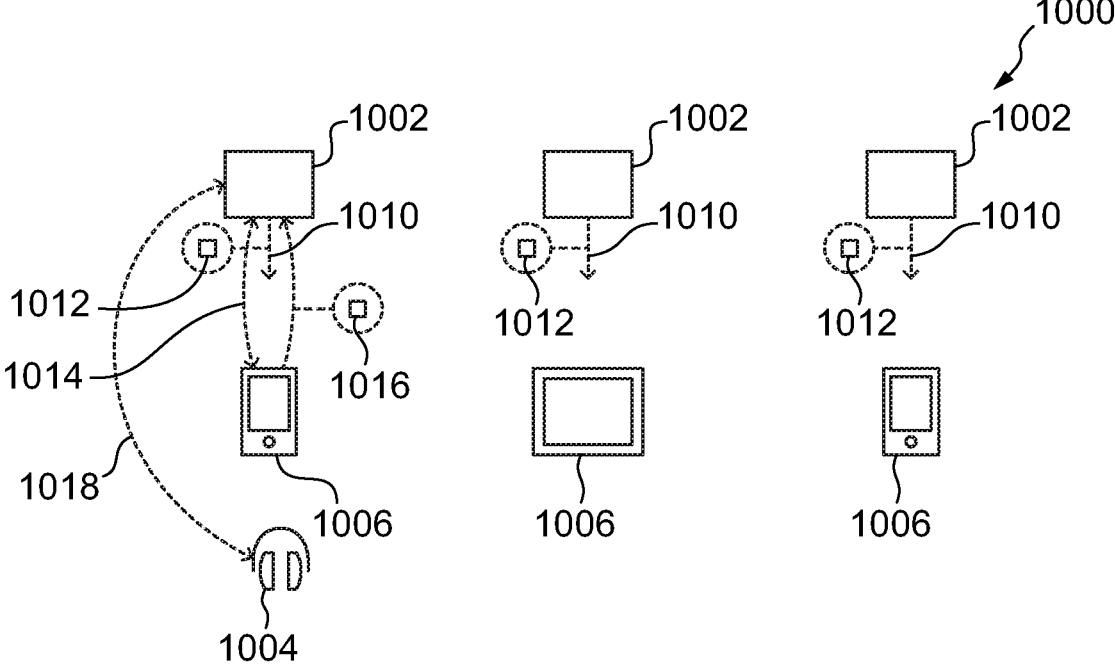
FIG. 10 shows schematically the method of FIG. 9.

An exemplary method of managing a wireless media system 1000, the system comprising a plurality of wireless media devices, will now be described with reference to FIG. 9 and FIG. 10. For ease of comparison with FIG. 3, elements of FIG. 10 similar to corresponding elements of FIG. 3 are labelled with reference signs similar to those used in FIG. 3, but with prefix "10" instead of "3".

In a first step 901, at least some of the plurality of wireless media devices 1002 periodically transmit first advertising packets 1010. It will be appreciated that, although three wireless media devices are shown in the Figure and described in detail below, this is for exemplary purposes only, and that the wireless media system 1000 may comprise any suitable or relevant number of wireless media devices. Additionally, it will be appreciated that, although three user devices are shown in the Figure and described in detail below, this is for exemplary purposes only, and that any relevant number of user devices may, in principle, be present. It will further be appreciated that, although only a single wireless audio device connected to a user device is shown in the Figure and described in detail below, this is for exemplary purposes only, and that each of the plurality of user devices may be connected to a corresponding wireless audio device.

The first advertising packets may comprise any suitable information. In some examples, at least some of the first advertising packets comprise identifiers relating to one or more aspects or properties of, or relating to, the first wireless media device. In some examples, at least some of the first advertising packets comprises a first physical location 1012 identifier associated with the corresponding first wireless media device. This enables a device receiving one of the first advertising packets to determine the location or position of the corresponding first wireless media device.

The first physical location identifier may comprise any suitable information or indicator of the location of the first wireless media device. In some examples, the first physical location identifier comprises absolute position information, such as information that indicates the location of the first wireless media device within a suitable reference frame (e.g., an aircraft interior). In such examples, a physical location identifier can be used to directly locate the corresponding first wireless media device.

In other examples, the first physical location identifier comprises relative position information or data. Such information allows proximity or a position relative to the wireless media device to be determined. In such examples, it is not necessary to know the absolute position of the wireless media device. In some examples, the position or location of the first wireless media device may be determined with reference to one or more features or objects within the relevant space. In an example, the first physical location identifier is a seat number. In this example, the seat number is a string of alphanumeric characters formatted in a suitable manner. In some examples, the physical location identifier is a seat number and comprises additional location information, including (but not limited to): cabin section; seating class or type; or ticket type. The additional location information may, in some examples, be used to enable additional operations, actions or processes to be carried out in dependence on the type of information or the information contents.

The first physical location identifier may be formatted or encoded in any suitable manner. In some examples, the first physical location identifier is encoded in accordance with one or more communication protocols, including (but not limited to): Bluetooth™ Classic; Bluetooth™ LE; Wi-Fi™; or ZigBee™. In some examples, the first physical location identifier is encoded in accordance with a wireless communication protocol. In an example, the first physical location identifier is encoded and formatted in accordance with the Bluetooth™ communication protocol.

In some examples, the first physical location identifier is encrypted in accordance with an appropriate encryption scheme or algorithm. It will be appreciated that numerous encryption schemes or algorithms may be envisaged within the scope of the present disclosure. In a second step 902, at least one first connection 1014 is established between at least one of the plurality of wireless media devices 1002 and at least one user device 1006. As described above, while only three user devices are shown in FIG. 10, this is purely for exemplary purposes. In principle, any relevant number of user devices could be present. The at least one first connection may be initiated in any suitable manner. In some examples, the at least one first connection is initiated in accordance with a wireless communication protocol, including (but not limited to): Bluetooth™; Wi-Fi™; or ZigBee™. Typically, connections between devices consist of a number of specified steps that are intended to ensure that a given connection is stable and secure. Such connection steps may be specified by the particular protocol standard.

In some examples, however, one or more additional steps are performed before, during or after the specified connection steps. Such additional steps may, for example, comprise additional security checks, device-specific operations, additional encoding or decoding, additional encryption or decryption, or any other such operations. In some examples, one or more sequences of additional steps may be carried out.

In a specific example, the step of establishing the first connection comprises sub-steps of: comparing the first physical location identifier associated with the first wireless media device with a second physical location identifier associated with a user; and based on a match between the first physical location identifier and the second physical location identifier, enabling a first connection protocol between the user device and the first wireless media device.

The second physical location identifier has a suitable encoding, format and/or encryption. The second physical location identifier comprises any suitable information or data content. It will be appreciated that, in order to carry out the comparison sub-step, the second physical location identifier must be comparable with the first physical location identifier. In some examples, the second physical location identifier is formatted and/or encoded, and contains substantially identical information or data content, as the first physical location identifier. In an example, the second physical location identifier is a seat number associated with the user.

The comparison sub-step is carried out in a suitable fashion. It will be appreciated that the details of this step is dependent on the format and/or encoding of the first physical location identifier and that of the second physical location identifier. In an example, wherein first physical location identifier and the second physical location identifier comprise alphanumeric strings, the comparison sub-step comprises comparing the alphanumeric string of the first physical location identifier directly with the alphanumeric string of the second physical location identifier.

For example, if both of the physical location identifiers comprise a seat number, the result of the comparison is that there is either a match or a mismatch between the seat number associated with the wireless media device and the seat number associated with the user. In case of a match, it may be concluded that the user is attempting to connect to the media device located at their assigned seat.

Based on a match between the first physical location identifier and the second physical location identifier, a second sub-step of enabling a first connection protocol between the user device and the first wireless media device is performed. As described above, the first connection may utilise a wireless communication protocol, including (but not limited to): Bluetooth™ Classic; Bluetooth™ LE; Wi-Fi™; or ZigBee™. Such communication protocols typically comprise specific sub-protocols or standards for establishing connections between devices.

The establishing step may comprise further optional or addition sub-steps. In an example, the establishing step comprises a further sub-step of scanning for advertising packets. The scanning may be performed in any suitable fashion and using a suitable communication protocol.

In a third step 903, at least one first identifier 1016 associated with at least one wireless audio device 1004 is received, each of the at least one wireless audio devices being connected with a corresponding on of the at least one user device 1006. The first identifier may contain any suitable or relevant information associated with the wireless audio device in order to suitably identify the wireless audio device. In some examples, the first identifier comprises a unique identifier (e.g., a unique identification number). In some examples, the first identifier is a communications address assigned to the wireless audio device. In an example, the first identifier is a Bluetooth™ device address assigned to the wireless audio device.

Transmitting the first identifier from the user device to the first wireless media device allows the first wireless media device to connect directly to the wireless audio device.

In a fourth step 904, at least one second connection 1018 between the at least one of the plurality of wireless media devices 1002 and the at least one wireless audio device 1004 is established. The second connection may be any suitable connection using a suitable protocol. Examples of suitable protocols include (without limitation): Bluetooth™ Classic; Bluetooth™ LE; Wi-Fi™; or ZigBee™.

The connection may be initiated in any suitable fashion and using any suitable methodology. An exemplary initiation step has been described in connection with above-mentioned examples.

In a fifth step 905, the at least one first connection is terminated. The termination may be effected in any suitable fashion. In some examples, the termination step is carried out in accordance with a connection termination methodology set out by the communication protocol.

It will be appreciated that the above-described method may, in some examples, comprise additional or optional steps.

In one example, the method comprises a step of determining the presence of a third connection between the user device and the wireless audio device. This may be accomplished in any suitable fashion, and may include a determination of the type of connection between the user device and the wireless audio device.

As may be appreciated, the above-described methods will typically not be used or implemented in isolation, but will typically be part of an overall management method or methodology for a wireless media device or a wireless media system, comprised of a plurality of wireless media devices. An example of such a management methodology will be discussed in more detail in the following.

As part of the overall management methodology, it will no doubt be appreciated that other exemplary methods may be implemented for various specific aspects of the overall system.

Most communication protocols for wireless communications are provided with a pre-defined or -allocated communication spectrum. Typically, in situations where there is a limited number of active devices making use of the available spectrum, there is little risk that the spectrum becomes congested. However, in situations where the available spectrum is limited, and in which there is a significant number of active devices, congestion may significantly impact the operation of the devices.

Figure 11:
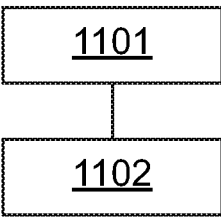
FIG. 11 illustrates a method for congestion management in a wireless media system in accordance with an aspect of the present disclosure.

An exemplary method for congestion management in a wireless media system, which comprises a plurality of wireless media devices, will now be described with reference to FIG. 11.

In a first step 1101, transmission power of at least a portion of the plurality of wireless media devices is managed. The transmission power may be managed in any suitable fashion. In some examples, transmission power for each wireless media device is set independently of the remaining wireless media devise.

In some examples, transmission power for each wireless media device is set based on a pre-defined transmission power schedule or scheme. In some examples, transmission power for each wireless media device is varied dynamically depending on one or more determining factors.

In some examples, transmission power for each wireless media device is set when each of the wireless media devices is powered on. In an example, the transmission power is set in dependence on one or more of (without limitation): the number of wireless media devices within a given range; or the density of wireless media devices within a predefined volume.

In a second step 1102, communication channel allocations for at least a portion of the plurality of wireless media devices are managed. The management step may comprise any suitable actions, operations or procedures.

It will be appreciated that numerous methods, methodologies, procedures and techniques for managing channel allocations may be envisaged within the scope of the present disclosure. One such exemplary step of managing channel allocations will be discussed in more detail below.

Figure 12:
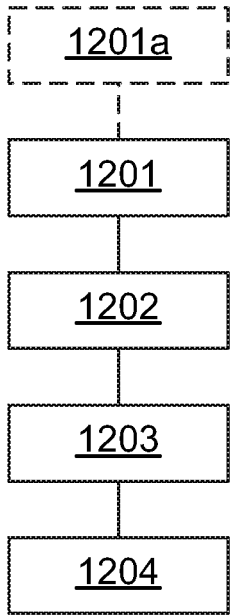
FIG. 12 shows an exemplary step of managing communication channel allocations in accordance with an aspect of the present disclosure.

Purely for exemplary purposes, an exemplary step of managing communication channel allocations will now be discussed with reference to FIG. 12.

In a first step 1201, at least a first plurality of communication channels is selected amongst a set of available communication channels. The first plurality may be selected in any suitable manner. In some examples, the first plurality is selected at random. In some examples, the first plurality is a set of successively numbered channels.

The set of available communication channels may comprise any suitable or relevant number of channels. In some examples, the set of available communication channels comprises a pre-defined number of individual communication channels. In some examples, the set of available communication channels is defined by a standard or communication protocol.

The first plurality of communication channels may comprise any suitable number of individual communication channels. In some examples, the first plurality of communication channels comprises a percentage of the set of available communication channels. In some examples, the first plurality of communication channels comprises a specific number of communication channels of the set of available communication channels.

In some examples, the first plurality of communication channels comprises at least 5 communication channels; optionally at least 10 communication channels; optionally at least 15 communication channels; or optionally at least 20 communication channels. In a specific example, the first plurality of channels comprises 20 communication channels. It will be appreciated that, the number of communication channels in the first plurality is, in some examples, dependent on the communication protocol in use. Some protocols have specific requirements in order to function or operate.

In a second step 1202, at least a second plurality of communication channels is selected amongst the set of available communication channels. The second plurality of communication channels may be selected in a suitable fashion. The selection may be performed amongst any suitable subset of the available communication channels. In an example, the selection is made of the remainder of the available communication channels after selection of the first plurality. This avoids reuse of channels and the ensuing overlap of channels in the first plurality and second plurality. This is particularly important for communication protocols (e.g., Bluetooth™) that use several channels or utilise channel-hopping/frequency shifting.

The second plurality of communication channels may comprise any suitable number of individual communication channels. In some examples, the second plurality of communication channels comprises a percentage of the set of available communication channels. In some examples, the second plurality of communication channels comprises a specific number of communication channels of the set of available channels.

In some examples, the second plurality of channels comprises at least 5 communication channels; optionally at least 10 communication channels; optionally at least 15 communication channels; or optionally at least 20 communication channels. In a specific example, the second plurality of channels comprises 20 communication channels. It will be appreciated that, the number of communication channels in the second plurality is, in some examples, dependent on the communication protocol in use. Some protocols have specific requirements in order to function or operate.

In an example, the second plurality of communication channels comprises the same number of communication channels as the first plurality of channels.

In a third step 1203, the first plurality of communication channels is assigned to a first subset of the plurality of wireless media devices.

The first subset may comprise any suitable number or percentage of wireless media devices in the plurality of wireless media devices. In some examples, the first subset comprises half of the total number of wireless media devices in the plurality of wireless media devices. In some examples, the number of wireless media devices in the first subset is dependent on one or more characteristics, factors or variable, including (but not limited to): the overall number of communication channels; the number of available communication channels; the number of wireless media devices in the plurality; or the number of subsets.

In a fourth step 1204, the second plurality of communication channels is assigned to a second subset of the plurality of wireless media devices.

The second subset may comprise any suitable number or percentage of wireless media devices in the plurality of wireless media devices. In some examples, the first subset comprises half of the total number of wireless media devices in the plurality. In some examples, the number of wireless media devices in the second subset is dependent on one or more characteristics, factors or variables, including (but not limited to): the overall number of communication channels; the number of available communication channels; the number of wireless media devices in the plurality of wireless media devices; or the number of subsets. In an example, the second subset comprises any wireless media devices of the plurality of wireless media devices not in the first subset.

In some examples, the method comprises an additional subset assignment step 1201*a* wherein each one of the wireless media devices in the plurality of wireless media devices is assigned to one of the first subset or the second subset. The assignment may be carried out in any suitable manner and using any suitable set of requirements, parameters, characteristics or properties.

It will be appreciated that, whilst only a first plurality of communication channels and a second plurality of communication channels, as well as the corresponding first subset and second subset of the plurality of wireless media devices, are described in the above example, the above example could, in principle, equally well be implemented with any suitable number of pluralities of communication channels and corresponding subsets of wireless media devices. For example, examples comprising three or more pluralities of communication channels, as well as corresponding three or more subsets of the plurality of wireless media devices, may be envisaged within the scope of the present disclosure. Further, examples comprising four or more pluralities of communication channels, as well as corresponding four or more subsets of the plurality of wireless media devices, may be envisaged within the scope of the present disclosure.

In the following, purely for conciseness reasons, reference will be made only to the first and second pluralities of communication channels, as well as their corresponding subsets, although it will be understood that this could, in effect, refer to any suitable number of pluralities and subsets.

Individual wireless media devices within the first and second subsets of wireless media devices may be arranged in a suitable or applicable pattern, layout or arrangement.

In order to reduce congestion, it is advantageous to ensure that any given wireless media device is not adjacent to any wireless media device using the same communication channel or plurality of channels. As will be appreciated, congestion is caused by two or more devices attempting to use or communicate in one communication channel or plurality of channels. It has been realised that preventing adjacent wireless media devices from using the same channel or channels will reduce congestion.

Figure 13:
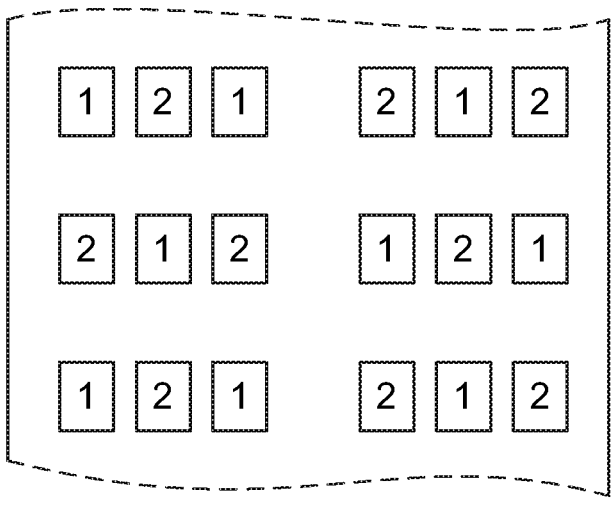
FIG. 13 shows an exemplary wireless media device arrangement in accordance with an aspect of the present disclosure.

A first exemplary wireless media device arrangement in accordance with the present disclosure will now be discussed with reference to FIG. 13. It will be appreciated that this arrangement is purely exemplary in nature. It will further be appreciated that other arrangements may be envisaged in accordance with the present disclosure.

In the present example, a passenger aircraft cabin comprises a number of passenger seats arranged in a number of discrete rows, each row comprising a number of seats on both sides of a central aisle. The layout is substantially identical to the arrangement shown in FIG. 1.

In the present example, each row of seats has three seats on either side of the central aisle. Each seat comprises a corresponding wireless media device, which is mounted in the back of the seat of the preceding row. Each wireless media device is part of either a first subset of wireless media devices (indicated with the numeral 1 in FIG. 13), to which has been assigned a first plurality of communication channels, or a second subset of wireless media devices (indicated with the numeral 2 in FIG. 13), to which has been assigned a second plurality of communication channels, substantially as described in the foregoing example.

The first subset the second subset are arranged such that the subsets form a 'checkerboard' pattern. Hence, each wireless media device is adjacent to wireless media devices that are part of the other subset in a first direction substantially parallel to the central axis of the cabin as well as in a second direction perpendicular to the first direction.

In the above, a number of exemplary methods have been described, which may be implemented in a number of wireless media systems.

Figure 14:
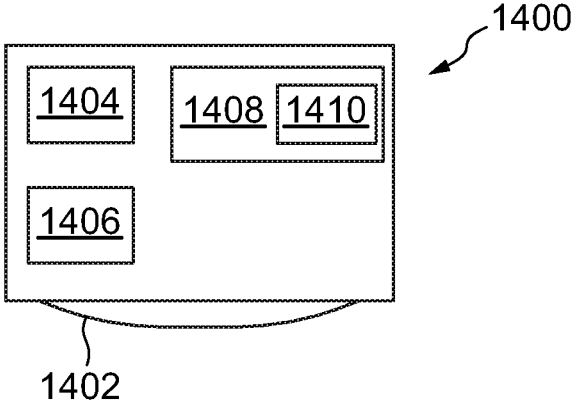
FIG. 14 illustrates an exemplary wireless media device in which one or more of the exemplary methods may be implemented.

A wireless media device in which one or more of these exemplary method, or individual steps thereof, may be implemented, will now be described in more detail with reference to FIG. 14.

The wireless media device 1400 comprises a display unit 1402, a processor 1404, a memory unit 1406, and a communications module 1408. The communications module comprises a transceiver element 1410.

The wireless media device may comprise any suitable display unit, processor and memory unit. Within the scope of the present disclosure, it will be appreciated that a number of suitable types such units may be envisaged.

The transceiver element 1410 of the communications module 1408 is operable to receive and transmit wireless signals using one or more pre-defined communication protocols. The transceiver element may be operable to receive and transmit any suitable wireless signals using any suitable communications protocols, such as (but not limited to): Bluetooth™ Classic; Bluetooth™ LE; Wi-Fi™; or Zig-Bee™. In an example, the transceiver element is operable to receive and transmit wireless signals of any one of the exemplary methods as set out above.

As described in the foregoing examples, it is necessary to reducing or eliminate congestion and interference between adjacent or close wireless media devices. In part, this is accomplished by way of one or more of the exemplary methods described in the foregoing.

Figure 15A:
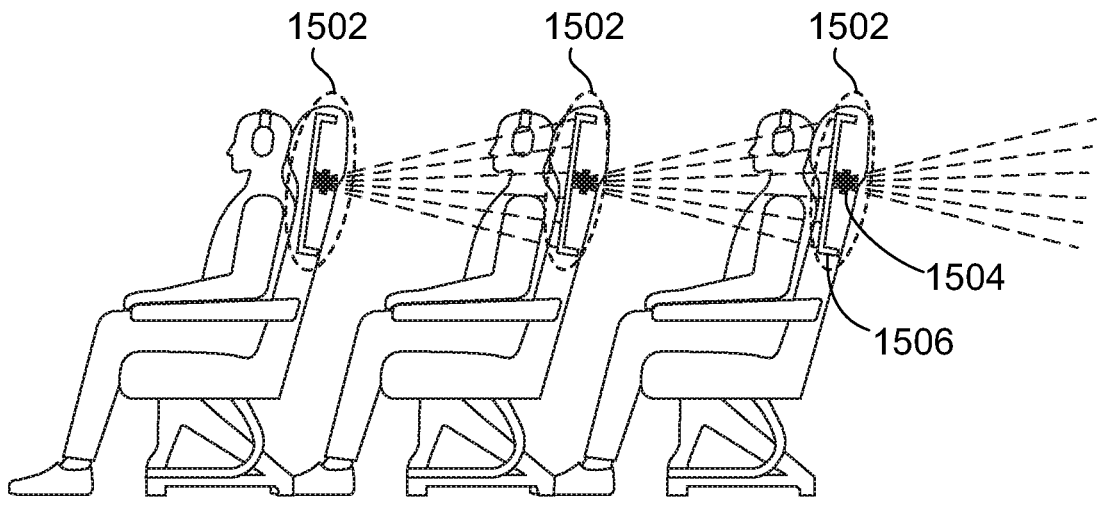
FIGS. 15a and 15b shows an exemplary transceiver element in accordance with the present disclosure.
Figure 15B:
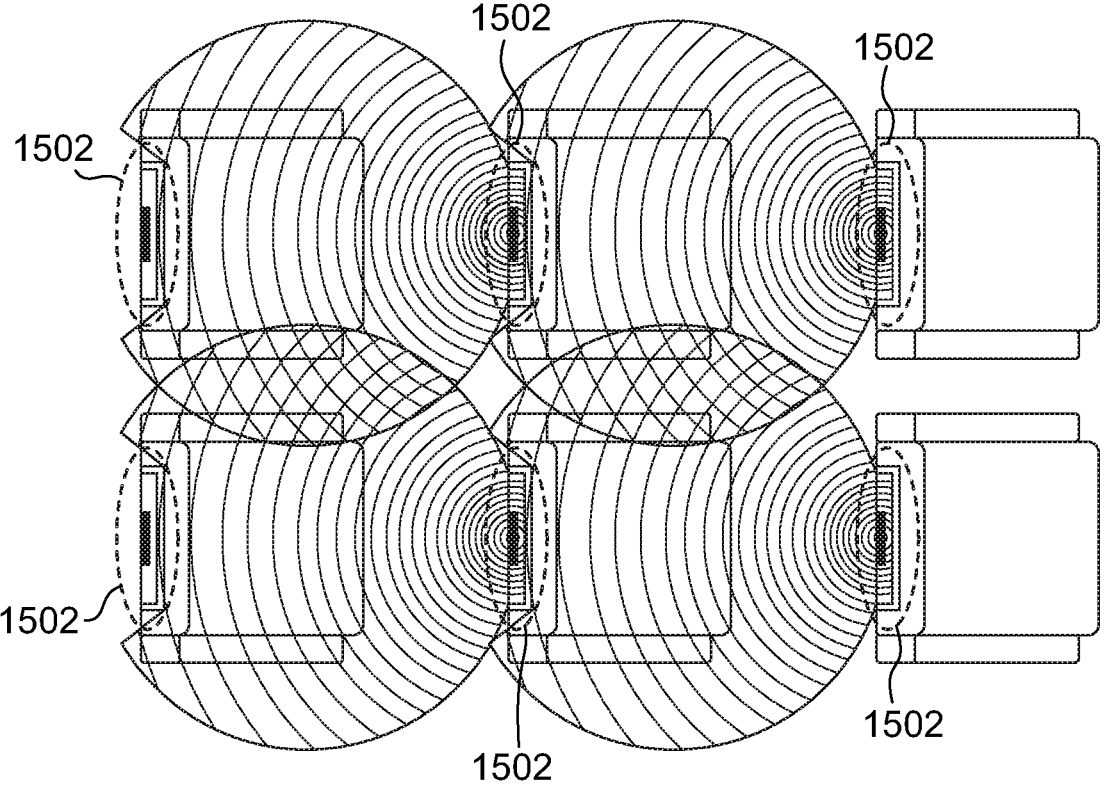

An exemplary transceiver element 1502 that accomplishes this will now be described with reference to FIG. 15a and FIG. 15b. The transceiver element comprises an antenna 1504 and a shielding element 1506, each of which will be described more detail below. In some examples, the transceiver element comprises one or more additional components or elements.

The antenna 1504 may be formed, arranged or configured in any suitable manner. It will be appreciated that a number of specific configurations or arrangements may be envisaged within the scope of the present disclosure.

The antenna has a first radiation profile. The first radiation profile may be dependent on the type, configuration or arrangement of the antenna.

It will be appreciated that some antenna arrangements or configurations may provide directional radiation profiles, which can at least reduce interference at other wireless media devices. However, it has been realised that due to the close proximity of individual antennas, as well as the close proximity of user devices or wireless audio devices, merely using directional antennas does not in all cases sufficiently reduce the risk of interference. To further reduce the risk of interference, the shielding element is provided.

The shielding element 1506 is formed or arranged in a suitable fashion so as to shield or attenuate any wireless signals transmitted to or from the antenna in a first set of azimuth angles and a first set of elevation angles. Purely for ease of reference in the following, the set of azimuth angles and the set of elevation angles for which the shielding element attenuates signals will be referred to as the 'shielding profile' of the shielding element.

It will, of course, be appreciated that, whilst a single set of azimuth angles and a single set of elevation angles has been referred to in the above, it is, in principle, possible for a shielding element to have a shielding profile that covers a plurality of individual sets of such angles. Purely for reasons of conciseness, in the following reference will generally be made to a single set of azimuth angles and a single set of elevation angles, although it will be understood that this is to be taken as a reference to "at least one" set of such angles.

The shielding element may perform the shielding in any suitable fashion. In some examples, the shielding element is formed or made of a specific material (or set of materials) that are substantially opaque to transmission signals within a suitable frequency spectrum.

In some examples, the shielding element is shaped or formed so as to at least partially surround the antenna. The shielding element may have any suitable shape, and/or may be formed of any suitable elements in order to partially surround the antenna. In an example, the shielding element is formed as a substantially rectangular shielding plate. Along the edges of the shielding plate is attached at least one side element, the at least one side element being attached so as to be substantially perpendicular to the shielding plate. In this example, the side elements and the shielding plate form a cuboid shape, the antenna being arranged substantially at or near the geometric centre of the cuboid.

It will, of course, be realised that the above-described cuboid shape is exemplary only and that other shapes for the shielding element may be envisaged, including (but not limited to): cylindrical; polygonal; spherical; or ellipsoidal.

In use, the shielding element effectively acts to shield radiation emitted by other wireless media devices, user devices or wireless audio devices within the shielding profile. In some examples, the shielding component reduces the received strength of any radiation received from any direction or directions within the shielding profile. In some examples, the shielding component substantially prevents any radiation received from any direction or directions within the shielding profile from being received by the antenna.

Various embodiments are described herein with reference to block diagrams or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory, computer-readable medium may include an electronic, magnetic, optical, electromagnetic, or semiconductor data storage system, apparatus or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM) or a portable digital versatile/video disc read-only memory (DVD/Blu-ray).

The computer program instructions may also be loaded onto a computer and/or other programmable data processing apparatus to cause a series of operational steps to be performed on the computer and/or other programmable data processing apparatus to cause a series of operational steps to be performed on the computer an/or other programmable apparatus to produce a computer-implemented process such that the instructions which execute on the computer or other programmable apparatus provide steps for implementing the functions/acts specified in the block diagrams and/or flowchart block or blocks.

Accordingly, the invention may be embodied in hardware and/or in software (including firmware, resident software, micro-code etc.) that runs on a processor, which may collectively be referred to as "circuitry", "a module" or variants thereof. It should also be noted that in some alternate implementations, the functions/acts noted in the blocks may occur out of the order noted in the flowcharts. For examples, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein and without limitation to the scope of the claims. The applicant indicates that aspects of the invention may consist of any such individual feature or combination of features. In view of the foregoing description it will be evident to a person skilled in the art that various modifications may be made within the scope of the invention.

The invention claimed is:

1. A system comprising:
    at least one communication interface;
    at least one processor;
    at least one non-transitory computer-readable medium; and
    program instructions stored on the at least one non-transitory computer-readable medium that are executable by the at least one processor such that the system is configured to:
        cause a wireless media device to transmit an advertising packet that includes a first physical location identifier associated with the wireless media device;
        based on the first physical location identifier and a second physical location identifier associated with a user of a user device that is communicatively coupled to a wireless audio device, establish a first connection between the wireless media device and the user device;
        cause the user device to transmit an audio device identifier associated with the wireless audio device to the wireless media device;
        based on the audio device identifier, establish a second connection between the wireless media device and the wireless audio device;

terminate the first connection between the wireless media device and the user device;

after terminating the first connection between the wireless media device and the user device, cause the wireless media device to begin transmitting, via the second connection, media content for playback by the wireless audio device; and play back, by the wireless audio device, the media content transmitted by the wireless media device.

2. The system of claim 1, wherein the program instructions that are executable by the at least one processor such that the system is configured to establish the first connection between the wireless media device and the user device comprise program instructions that are executable by the at least one processor such that the system is configured to:

compare the first physical location identifier with the second physical location identifier;

determine that the first physical location identifier and the second physical location identifier match; and based on the determination, enable a first connection protocol between the wireless media device and the user device.

3. The system of claim 2, further comprising program instructions stored on the at least one non-transitory computer-readable medium that are executable by the at least one processor such that the user device is configured to:

scan for advertising packets; and detect the advertising packet transmitted by the wireless media device.

4. The system of claim 1, wherein the program instructions that are executable by the at least one processor such that the system is configured to establish the second connection between the wireless media device and the wireless audio device comprise program instructions that are executable by the at least one processor such that the system is configured to:

cause the wireless media device to transmit a request to the user device to initiate a pairing protocol between the wireless media device and the wireless audio device;

complete the pairing protocol based on the audio device identifier; and initialize a path connection between the wireless media device and the wireless audio device.

5. The system of claim 4, wherein the pairing protocol involves interaction with a physical interface of the wireless audio device.

6. The system of claim 1, wherein the first physical location identifier comprises a seat number associated with the wireless media device.

7. The system of claim 1, wherein the second physical location identifier comprises a seat number associated with the user of the user device.

8. The system of claim 1, further comprising program instructions stored on the at least one non-transitory computer-readable medium that are executable by the at least one processor such that the system is configured to:

before causing the wireless media device to transmit the advertising packet:

receive, by the wireless media device, a request to establish a connection with the user device.

9. The system of claim 1, wherein the audio device identifier comprises a communications address assigned to the wireless audio device.

10. The system of claim 1, wherein the audio device identifier comprises a Bluetooth device address assigned to the wireless audio device.

11. The system of claim 1, wherein the first connection comprises a BLE (Bluetooth Low Energy) connection.

12. The system of claim 1, wherein the second connection comprises a Bluetooth Classic connection.

13. At least one non-transitory computer-readable medium, wherein the at least one non-transitory computer-readable medium is provisioned with program instructions that, when executed by at least one processor, cause a system to:

cause a wireless media device to transmit an advertising packet that includes a first physical location identifier associated with the wireless media device;

based on the first physical location identifier and a second physical location identifier associated with a user of a user device that is communicatively coupled to a wireless audio device, establish a first connection between the wireless media device and the user device;

cause the user device to transmit an audio device identifier associated with the wireless audio device to the wireless media device;

based on the audio device identifier, establish a second connection between the wireless media device and the wireless audio device;

terminate the first connection between the wireless media device and the user device;

after terminating the first connection between the wireless media device and the user device, cause the wireless media device to begin transmitting, via the second connection, media content for playback by the wireless audio device; and play back, by the wireless audio device, the media content transmitted by the wireless media device.

14. The at least one non-transitory computer-readable medium of claim 13, wherein the program instructions that, when executed by at least one processor, cause the system to establish the first connection between the wireless media device and the user device comprise program instructions that, when executed by at least one processor, cause the system to:

compare the first physical location identifier with the second physical location identifier;

determine that the first physical location identifier and the second physical location identifier match; and based on the determination, enable a first connection protocol between the wireless media device and the user device.

15. The at least one non-transitory computer-readable medium of claim 14, wherein the at least one non-transitory computer-readable medium is also provisioned with program instructions that, when executed by at least one processor, cause the user device to:

scan for advertising packets; and detect the advertising packet transmitted by the wireless media device.

16. The at least one non-transitory computer-readable medium of claim 13, wherein the program instructions that, when executed by at least one processor, cause the system to establish the second connection between the wireless media device and the wireless audio device comprise program instructions that, when executed by at least one processor, cause the system to:

cause the wireless media device to transmit a request to the user device to initiate a pairing protocol between the wireless media device and the wireless audio device;

complete the pairing protocol based on the audio device identifier; and initialize a path connection between the wireless media device and the wireless audio device.

17. The at least one non-transitory computer-readable medium of claim 13, wherein the first physical location identifier comprises a seat number associated with the wireless media device.

18. The at least one non-transitory computer-readable medium of claim 13, wherein the second physical location identifier comprises a seat number associated with the user of the user device.

19. A method carried out by a system, the method comprising:

causing a wireless media device to transmit an advertising packet that includes a first physical location identifier associated with the wireless media device;

based on the first physical location identifier and a second physical location identifier associated with a user of a user device that is communicatively coupled to a wireless audio device, establishing a first connection between the wireless media device and the user device;

causing the user device to transmit an audio device identifier associated with the wireless audio device to the wireless media device;

based on the audio device identifier, establishing a second connection between the wireless media device and the wireless audio device;

terminating the first connection between the wireless media device and the user device;

after terminating the first connection between the wireless media device and the user device, causing the wireless media device to begin transmitting, via the second connection, media content for playback by the wireless audio device; and playing back, by the wireless audio device, the media content transmitted by the wireless media device.

20. The method of claim 19, wherein establishing the first connection between the wireless media device and the user device comprises:

comparing the first physical location identifier with the second physical location identifier;

determining that the first physical location identifier and the second physical location identifier match; and based on the determination, enabling a first connection protocol between the wireless media device and the user device.

* * * * *